3,394,176
α-NAPHTHYL-γ-PHENOXYBUTYRIC ACIDS
Graham John Durant, Watton-at-Stone, Gordon Mellis Smith, Welwyn Garden City, and Robert Geoffrey William Spickett, Harpenden, England, assignors to Smith Kline & French Laboratories, Philadelphia, Pa., a corporation of Pennsylvania
No Drawing. Filed Aug. 6, 1965, Ser. No. 477,990
Claims priority, application Great Britain, Aug. 13, 1964, 33,111/64
3 Claims. (Cl. 260—520)

This invention relates to new α-naphthyl-γ-phenoxybutyric acids having pharmacodynamic activity, in particular having anti-inflammatory and analgesic activity.

The compounds of this invention are useful in experimental pharmacology in studying drug action and for comparison purposes in evaluating potential medicinal agents. Illustrative of the activity of an exemplary compound of this invention is the anti-inflammatory activity of α-(1-naphthyl)-γ-(2,6-xylyloxy)butyric acid as shown in the anti-ultraviolet erythema test in guinea pigs at 200 mg./kg. orally.

The α-naphthyl-γ-phenoxybutyric acids of this invention are represented by the following formula:

(Formula I)

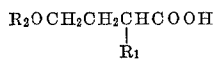

in which:

$R_1$ is 1-naphthyl or 2-naphthyl and
$R_2$ is phenyl or phenyl substituted by from one to two lower alkyl or lower alkoxy groups.

The terms "lower alkyl" and "lower alkoxy" where used herein denote groups having 1 to 4 carbon atoms.

The compounds of this invention are prepared by alkaline hydrolysis of a nitrile of the formula:

(Formula II)

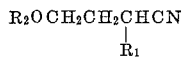

The terms $R_1$ and $R_2$ are as defined above.

The hydrolysis may be carried out using as the hydrolysis medium, for example, a solution of an alkali metal hydroxide such as sodium or potassium hydroxide in an alcohol such as ethyl alcohol or benzyl alcohol.

The nitriles of Formula II are prepared by forming the anion of a nitrile of the formula $R_1$—$CH_2CN$ using a strong base such as sodium hydride in a solvent such as benzene or dimethylformamide and reacting said anion with a halide of the formula $R_2OCH_2CH_2$-halogen.

The halide intermediates $R_2OCH_2CH_2$-halogen are either known to the art or are prepared by known methods such as by heating a sodium phenoxide with an excess of ethylene dibromide in alcohol solution.

The following examples are not limiting but are illustrative of the compounds of this invention and methods of preparing them.

EXAMPLE 1

1-naphthaleneacetonitrile (16.7 g.) is dissolved in dimethylformamide and treated with 4.5 g. of a 54% dispersion of sodium hydride in paraffin oil with stirring under anhydrous conditions. The resulting mixture is stirred in nitrogen atmosphere for one hour, then cooled in an ice bath while 22.9 g. of 2-(2,6-xylyloxy)ethyl bromide in 75 ml. of anhydrous benzene is added gradually. The mixture is heated at 35–40° C. for three hours, then left overnight. The mixture is added to ice, acidified with 5 N hydrochloric acid and extracted with ether. The ether extracts are washed with water and dried over potassium carbonate. The solvent is removed by distillation and the residue is distilled to give α-(1-naphthyl)-γ-(2,6-xylyloxy) butyronitrile, B.P. 150–160° C. at 0.4 mm., M.P. 63–69° C.

To 11.2 g. of the above prepared nitrile is added 3.0 g. of potassium hydroxide in 40 ml. of benzyl alcohol and the resulting solution is boiled under reflux for 16 hours. Evaporation in vacuo, followed by acidification and recrystallization from light petroleum ether gives α-(1-naphthyl)-γ-(2,6-xylyloxy)-butyric acid, M.P. 100–102° C.

EXAMPLE 2

By the procedure of Example 1, 16.7 g. of 2-naphthaleneacetonitrile dissolved in dimethylformamide is treated with 4.5 g. of a 54% paraffin oil dispersion of sodium hydride. The mixture is cooled and treated with 20.1 g. of 2-phenoxyethyl bromide in 75 ml. of anhydrous benzene. The resulting mixture is heated at 40° C. for three hours. Working up as in Example 1 gives α-(2-naphthyl)-γ-phenoxybutyronitrile.

Hydrolysis of the above prepared nitrile by heating with potassium hydroxide in benzyl alcohol gives α-(2-naphthyl)-γ-phenoxybutyric acid.

EXAMPLE 3

By the procedure of Example 1, using 16.7 g. of 1-naphthaleneacetonitrile and 2.5 g. of sodium hydride in benzene and treating the resulting mixture with 23.1 g. of 2-(2-methoxyphenoxy)ethyl bromide the intermediate α-(1-naphthyl)-γ-(2-methoxyphenoxy)butyronitrile is obtained.

Hydrolysis of the above prepared nitrile with benzyl alcohol solution of sodium hydroxide gives α-(1-naphthyl)-γ-(2-methoxyphenoxy)butyric acid.

Similarly, using 17.0 g. of 2-(2-methylphenoxy)ethyl chloride in place of 2-(2-methoxyphenoxy)ethyl bromide in the above process the product is α-(1-naphthyl)-γ-(2-methylphenoxy)-butyric acid.

EXAMPLE 4

A mixture of 68 g. o-propylphenol, 282 g. ethylene dibromide, and a solution of sodium hydroxide (20 g.) in ethanol (150 ml.) is refluxed for 24 hrs. The solvent and excess ethylene dibromide are removed by distillation in vacuo, and the residual oil is extracted with ether and washed successively with water, dilute sodium hydroxide solution, and water. Evaporation of the dried ethereal solution and distillation gives 2-(2-propylphenoxy) ethyl bromide.

This compound (24.3 g.) is used under the conditions of Example 1 to react with 1-naphthaleneacetonitrile (16.7 g.) and sodium hydride (2.5 g.) to give α-(1-naphthyl)-γ-(2-propylphenoxy)butyronitrile. Hydrolysis of this compound with a benzyl alcohol solution of sodium hydroxide gives α-(1-naphthyl)-γ-(2-propylphenoxy) butyric acid.

The same reactions, starting respectively from 4-butoxyphenol (84 g.) or 3,5-dimethoxyphenol (77 g.) are used to prepare α-(1-naphthyl)-γ-(4-butoxyphenoxy)butyric acid or α-(1-naphthyl)-γ-(3,5-dimethoxyphenoxy)butyric acid.

What is claimed is:
1. A compound of the formula:

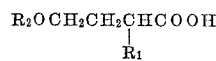

in which:
$R_1$ is 1-naphthyl or 2-naphthyl and
$R_2$ is phenyl or phenyl substituted by from one to two lower alkyl or lower alkoxy groups.

2. A compound of the formula:
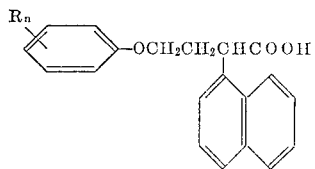
in which R is lower alkyl and *n* is 1 or 2.
3. A compound of the formula:
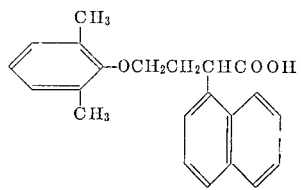
References Cited
Buu-Hoi et al.: Chem. Abstr., vol. 40, p. 4051, 1946.
HENRY R. JILES, *Primary Examiner.*
D. STENZEL, *Assistant Examiner.*